United States Patent [19]

Cowan et al.

[11] 4,404,107

[45] * Sep. 13, 1983

[54] WELL WORKING COMPOSITIONS, METHOD OF DECREASING THE SEEPAGE LOSS FROM SUCH COMPOSITIONS, AND ADDITIVE THEREFOR

[75] Inventors: Jack C. Cowan, Lafayette, La.; Tommy Thrash, Littlefield, Tex.; Jerry R. Rayborn, New Orleans, La.

[73] Assignee: Venture Chemicals, Inc., Lafayette, La.

[*] Notice: The portion of the term of this patent subsequent to Oct. 26, 1999, has been disclaimed.

[21] Appl. No.: 269,493

[22] Filed: Jun. 1, 1981

[51] Int. Cl.$^3$ .......................... C09K 7/06; C09K 7/02
[52] U.S. Cl. .................................... 252/8.5 M; 162/6; 162/99; 252/8.5 LC; 252/8.5 C; 252/8.55 R
[58] Field of Search ............. 252/8.5 C, 8.5 M, 8.5 P, 252/8.5 LC, 8.55 R; 162/6, 66, 99; 8/116 V

[56] References Cited

U.S. PATENT DOCUMENTS

| | | | |
|---|---|---|---|
| 2,195,302 | 3/1940 | Hampel | 162/66 |
| 2,477,219 | 4/1949 | Van Dyke | 252/8.5 |
| 2,599,745 | 6/1952 | Campbell et al. | 252/8.5 |
| 3,310,125 | 3/1967 | Darley | 252/8.5 X |
| 4,356,096 | 10/1982 | Cowan et al. | 252/8.55 X |

*Primary Examiner*—Herbert B. Guynn
*Attorney, Agent, or Firm*—Roy F. House

[57] ABSTRACT

Disclosed is a fine particle size hydrophobic organophilic water wettable cotton and its use as a seepage control additive in well-working fluids. Also disclosed is a process of preparing this additive which comprises reacting raw cotton, which contains its natural oils and waxes, with dry hydrochloric acid gas.

8 Claims, No Drawings

WELL WORKING COMPOSITIONS, METHOD OF DECREASING THE SEEPAGE LOSS FROM SUCH COMPOSITIONS, AND ADDITIVE THEREFOR

The invention relates to compositions for use in well-working operations such as drilling, workover and completion, packing and the like, well-working processes utilizing such compositions, and an additive to reduce the seepage loss of the compositions to the formation.

In the rotary drilling of wells for oil and gas, drilling fluids ("muds") are circulated in such a manner as to remove cuttings and to support the walls of the hole. The fluids may be either water base, comprising for example, clay, polymers, weight material and other additives dispersed in water, or oil base, comprising for example, suspending agents (generally organophilic clays), emulsifiers, stability agents, filtration control agents, weighting agents, and other additives dispersed in diesel oil and the like oleaginous mediums, all as are well known in the art.

A thin, low-permeability filter cake on the sides of the borehole is necessary to control the filtration characteristics of the drilling fluid since the pressure of the mud column in the borehole is greater than the formation pressure. A filter cake forms when the drilling fluid contains particles of a size only slightly smaller than the size of the pore openings of the formation. The liquid which enters the formation while the cake is being established is known as the surge loss or spurt loss, while the liquid which enters after the cake is formed as the drilling fluid filtrate. The permeability of the filter cake is directly related to the particle size distribution in the drilling fluid and, in general, the cake permeability decreases as the concentration of particles in the colloidal size range increases.

The filtration properties required for the successful completion of a well depend on the nature of the formations being drilled and on the type of drilling fluid used. Thus in water sensitive formations, oil base mud provides superior hole stabilization when the salinity of the aqueous phase of the mud is adjusted to prevent migration of water from the mud to the formation.

Both the spurt loss and filtration rate must be minimized when penetrating potentially productive formations in order to minimize any damaging effects from fluids entering the formation. These properties should also be minimized throughout the drilling process when using oil base muds because of the high cost of these muds.

Through the years there have been used, and proposed for use, many materials to decrease the filtration rate of drilling fluids. These include starch and starch derivatives, water soluble cellulose derivatives, humates, lignin derivatives, clays, polymers and emulsified oil droplets in water base muds, and asphaltic materials, organophilic clays, organophilic humates, organophilic lignosulfonates, emulsified water droplets, and the like in oil base muds. However, there are few effective materials to decrease the spurt loss or seepage of whole mud to the formation. Materials which have been used include cotton seed hulls, mica, vermiculite, nut shells, coal, asbestos, bagasse, paper, and various particulate wood products.

Accordingly, there is a need for a seepage or spurt loss control agent which is effective in both aqueous and nonaqueous fluids.

It is an object of the present invention to provide a hydrophobic, organophilic, water wettable cotton which is very effective as a seepage or spurt loss control agent in both water base and oil base well working fluids.

It is another object of this invention to provide well working compositions having a low seepage or spurt loss which contain a hydrophobic, organophilic, water wettable cotton.

These and other objects of this invention will appear to one skilled in the art as the description thereof proceeds.

In accordance with one illustrative embodiment of our invention, we have found that a hydrophobic, organophilic, water wettable cotton (hereinafter sometimes referred to as HOWWC) is effective in both oil base and water base fluids to decrease the seepage loss or spurt loss thereof.

This HOWWC is conveniently prepared by treating raw cotton in an air dried condition, containing from about 0% to about 20% water, by weight, with dry hydrochloric acid gas in an amount from about 0.3% to about 3% by weight of the cotton at a temperature in the range from about 75° F. to about 180° F. during a treatment period from about 10 minutes to about 48 hours. During this treatment the cotton linters are mechanically degraded by buffering, augering, abrading, vibrating, etc. Thereafter the HOWWC may be further mechanically degraded, if desired, by any suitable grinding means such as a hammer mill. During the processing of the HOWWC it is important that no subsequent washing out or neutralization of the HCl gas be undertaken. In this manner the combination of the gaseous hydrochloric acid, temperature, and mechanical action are sufficient to produce a surface modified cotton which is of extremely fine particle size. Furthermore, it is important to use raw unprocessed cotton, preferably cotton linters, which have not been treated to remove any of the waxes or oils therefrom. In this manner there is produced a micronized, surface modified cotton which is hydrophobic, organophilic, and water wettable.

The hydrophobic, organophilic and water wettable character of the HOWWC is very important as it allows this material to be utilized in both oil base and water base fluids. Although hydrophobic and organophilic, the HOWWC readily wets in water containing a surfactant or upon agitation to reduce the seepage or spurt loss of aqueous well working fluids. Furthermore, the HOWWC is effective in all aqueous systems including saturated brines.

The particle size of the HOWWC must be such that at least 95% by weight of the HOWWC present in a 10% by weight water suspension of HOWWC passes through a 100 mesh (U.S) sieve.

The well working compositions of our invention can be prepared by adding the HOWWC to any water base or oil base well working fluid. A water base well working composition will generally contain a suspending agent, such as a clay or polymer, weight material which may be insoluble, such as barite, siderite, galena, ilmenite, hematite, and the like, or which may be a soluble salt such as sodium chloride, potassium chloride, calcium chloride, calcium bromide, zinc bromide and the like, fluid loss control additives such as starch, CMC, carboxymethyl starch, polyacrylates and other polymers, and other additives such as viscosity control agents, lubricants, emulsifiers, lost circulation materials, and other functional additives. Oil base well working fluids will generally contain additives which provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamides, and the like.

Another embodiment of our invention is a process to decrease the seepage loss or spurt loss of a well working fluid, particularly drilling fluids, which comprises adding to the well working fluid a quantity of HOWWC sufficient to effect such decrease. Generally, there will be required from about 2 pounds per 42 gallon barrel (ppb.) to about 50 ppb., preferably from about 4 ppb. to about 20 ppb.

In order to more completely describe the invention, the following non-limiting examples are given. In these examples, the HOWWC was prepared by reacting raw, untreated, cotton linters with 1.5% by weight dry hydrochloric acid gas at a temperature in the range from about 130° F. to about 160° F. for about 10 minutes in an apparatus designed to tumble the cotton linters. Thereafter the treated cotton linters were removed from the reactor, buffed, screened, and air classified such that at least 95% by weight of the HOWWC passed through a 100 mesh sieve by wet screen analysis.

The HOWWC is hydrophobic, organophilic, and water wettable as evidensed by the fact that it floats and is not wetted when added to water, it preferentially sorbs and collects oil from a mixture of oil and water, and that it is readily wetted when agitated in water.

EXAMPLE 1

The HOWWC was mixed into a 10.8 ppg. (pounds per gallon) lignosulfonate field drilling fluid in various amounts as listed in Table 1. Thereafter the standard API RP 13B rheology was determined. The ability of the drilling fluid to seal off a porous sand was evaluated in the following manner: 100 grams of coarse blasting sand was placed in an API filter press with only the screen in place (no paper), water was added, and the water drained to remove the free water; 350 ml. of the mud were then added to the cell and 100 psi differential pressure was applied as in the standard API fluid loss test; thereafter the fluid which seeped through the sand pack was caught until the sand pack was sealed, i.e., when only drops of fluid emerged from the sand pack. The volume of fluid which seeped through the sand pack until an effective seal was formed was measured.

The data are given in Table 1.

The data indicate that the HOWWC in concentrations of 4–50 ppb. reduced the seepage loss from "no shut-off" to 2 ml. before sealing this unconsolidated sand pack. Pretreatment of the entire mud system up to 20 ppb. in low density muds can usually be made to incrementally reduce seepage loss without significantly altering rheological properties. Concentrations above this level can be utilized by the use of surfactants/dispersants.

EXAMPLE 2

Six ppb. HOWWC were mixed into an oil base field mud. This mud had a diesel oil/water ratio of 80/20, an aqueous phase saturated with calcium chloride, and contained commercially available suspending agent, emulsifiers, and fluid loss additive. Thereafter the standard API RP 13B emulsion stability, rheology and fluid loss were measured. The ability of the drilling fluid to seal a one inch thick bed of +20 mesh sand was determined as in Example 1. The data obtained are given in Table 2.

The data indicate that the HOWWC was a very effective sealant for oil base muds.

In cases of severe seepage loss, a concentrated wiping pill can be prepared in water or oil containing up to about 150 ppb. of HOWWC and circulated in the borehole.

TABLE 1

| | Comparative Example 1 | A | B | C | D | E | F |
|---|---|---|---|---|---|---|---|
| HOWWC, ppb. | 0 | 4 | 6 | 10 | 20 | 50 | 50 |
| Surfactant, ppb. | 0 | 0 | 0 | 0 | 0 | 0 | 10 |
| Plastic Viscosity, cp. | 9 | 9 | 12 | 11 | 16 | 27 | 17 |
| Yield Point, lb./100 sq. ft. | 10 | 10 | 3 | 7 | 6 | 67 | 57 |
| Sealing Test | | | | | | | |
| Shut-Off Volume, ml. | None | 100 | 50 | 35 | 17 | 2 | 2 |

TABLE 2

| | Comparative Example 2 | Example 2 |
|---|---|---|
| HOWWC, ppb. | 0 | 6 |
| Plastic Viscosity, cp. | 73 | 76 |
| Yield Point, lb./100 sq. ft. | 11 | 12 |
| 10-sec. gel., lb./100 sq. ft. | 12 | 12 |
| 10-min. gel., lb./100 sq. ft. | 13 | 13 |
| Emulsion Stability, volts | 625 | 600 |
| Sealing Test | | |
| Shut-Off Volume, ml. | 130 | 15 |
| Shut-Off Time, sec. | 95 | 3 |

We claim:

1. Hydrophobic, organophilic, water wettable cotton for use in well working compositions having a particle size such that at least 95% by weight of said cotton present in a 10% by weight water suspension passes through a 100 mesh sieve produced by the process comprising:
   (a) reacting raw cotton with dry, gaseous hydrochloric acid in an amount from about 0.3% to about 3% by weight of the cotton at a temperature in the range from about 75° F. to about 180° F.; and
   (b) mechanically degrading the cotton.

2. The treated cotton of claim 1 wherein said raw cotton contains up to about 20% water.

3. The treated cotton of claim 2 wherein said raw cotton is cotton linter.

4. The treated cotton of claim 1 wherein said raw cotton is cotton linter.

5. A well-working fluid comprising as a major constituent an oily petroleum liquid and sufficient of the hydrophobic, organophilic, water wettable cotton of claim 1, 2, 3, or 4 to effect a substantial reduction of the spurt loss of said well-working fluid.

6. A well-working fluid comprising as a major constituent an aqueous liquid and sufficient of the hydrophobic, organophilic, water wettable cotton of claim 1, 2, 3, or 4 to effect a substantial reduction of the spurt loss of said well-working fluid.

7. A process of reducing the seepage of a water base well-working fluid into a subterranean formation which comprises adding to said well-working fluid a quantity of the hydrophobic, organophilic, water wettable cotton of claim 1, 2, 3, or 4 sufficient to effect such reduction.

8. A process of reducing the seepage of an oil base well-working fluid into a subterranean formation which comprises adding to said well-working fluid a quantity of the hydrophobic, organophilic, water wettable cotton of claim 1, 2, 3, or 4 sufficient to effect such reduction.

* * * * *